United States Patent [19]

Rieder et al.

[11] Patent Number: 5,079,850
[45] Date of Patent: Jan. 14, 1992

[54] PROTECTIVE HOUSING FOR ACCOMMODATING A SCALE MEMBER AND A LONGITUDINALLY MOVABLE SCANNING UNIT OF A LENGTH MEASURING SYSTEM

[76] Inventors: Heinz Rieder, Riedersbach 90, A-5120 St. Pantaleon; Max Schwaiger, Österreich, A-5121 Ostermiething 298, both of Austria

[21] Appl. No.: 579,878

[22] Filed: Sep. 7, 1990

[30] Foreign Application Priority Data

Sep. 12, 1989 [AT] Austria ............................. 2128/89

[51] Int. Cl.⁵ ............................................. G01B 11/04
[52] U.S. Cl. ............................................. 33/705; 33/703
[58] Field of Search ............... 33/705, 703, 704, 701, 33/702; 250/237 G; 277/DIG. 4, 706, 707, 708

[56] References Cited

U.S. PATENT DOCUMENTS

| 4,165,564 | 8/1979 | Burkhardt | 33/705 |
| 4,170,829 | 10/1979 | Nelle | 33/702 |
| 4,320,578 | 3/1982 | Ernst | 33/702 |
| 4,570,347 | 2/1986 | Miller | 33/705 |
| 4,584,773 | 4/1986 | Reider et al. | 33/700 |

Primary Examiner—William A. Cuchlinski, Jr.
Assistant Examiner—William C. Dowling
Attorney, Agent, or Firm—Collard, Roe & Galgano

[57] ABSTRACT

A protective housing for accommodating a scale member and a longitudinally movable scanning unit of a length measuring system comprises a housing tube, which is adapted to support the scale member and preferably has a basically rectangular cross-section and in one narrow side wall is formed with a slot, which is adapted to receive an actuating member, which is adapted to be coupled to the scanning unit, and which housing tube is adapted to be closed at both ends by end closures, which are adapted to hold the housing in position and protrude beyond the ends of the housing tube. In order to facilitate the assembling, sealing and aligning each end closure is integrally formed with an end core, which comprises an inner end portion, which conforms to the inside surface of the housing tube, each end closure also comprises an end block having a shoulder abutting the end face of the housing tube, and each end closure is formed between said inner end portion and said shoulder with a peripheral groove, which accommodates a sealing element.

11 Claims, 2 Drawing Sheets

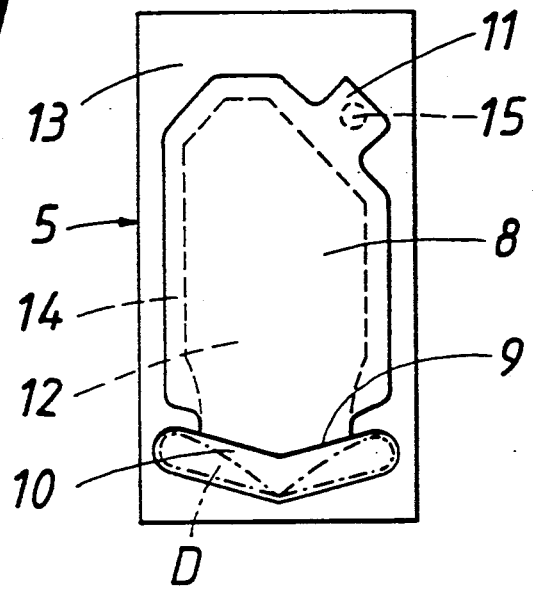
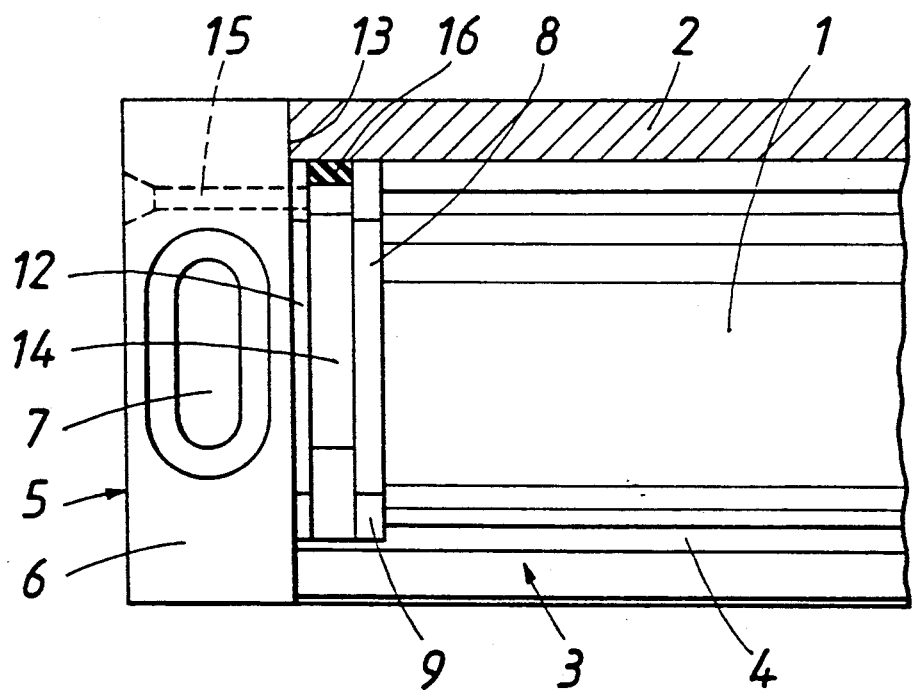

PROTECTIVE HOUSING FOR ACCOMMODATING A SCALE MEMBER AND A LONGITUDINALLY MOVABLE SCANNING UNIT OF A LENGTH MEASURING SYSTEM

BACKGROUND OF THE INVENTION

1. Field of the Invention

This invention relates to a protective housing for accommodating a scale member and a longitudinally movable scanning unit of a length measuring system, which comprises a housing tube, which is adapted to support the scale member and preferably has a basically rectangular cross-section and one narrow side wall is formed with a slot, which is adapted to receive an actuating member, which is adapted to be coupled to the scanning unit, and which housing tube is adapted to be closed at both ends by end closures, which are adapted to hold said housing in position and protrude beyond the ends of the housing tube.

2. Description of the Prior Art

The protective housing is intended for use in length measuring systems consisting of absolute length measuring systems or of incremental length measuring systems. In both cases the scanning unit is movable along the scale member by means of the actuating member and is adapted to scan the scale member or a measuring scale provided on the scale member, which is adapted to be scanned by said scanning unit by optoelectronic, capacitive or inductive scanning methods and to generate measured-value signals or to read the scale member as a result of such scanning. The interior of the housing tube must be protected from being soiled. Besides, it is desired to ensure that the scale member will be in the correct measuring position when the housing is mounted by means of the end closures. It is known that the end closures may consist of shaped bodies, which are mounted at the ends of the housing tube, which at said ends has inside surfaces which are complementary to extensions of the shaped bodies. Such an arrangement has the disadvantage that an expensive machining of the end closures and of the tube end portions is required, that an absolutely exact alignment of the end closures is not achieved in many cases and that the necessary sealing of the tube at its ends is not achieved in many cases.

SUMMARY OF THE INVENTION

It is an object of the invention to provide a protective housing which is of the kind described first hereinbefore and in which an exact alignment of the end closures with the housing tube is ensured by the provision of simple means, a simple machining of the housing tube, particularly in that it is cut off at right angles to its longitudinal direction, and a satisfactory sealing of the housing tube at its ends and a protected accommodation of the ends of the scale member and a sealed mounting of the ends of sealing lips extending on opposite sides of the slot are ensured.

In a protective housing of the kind described hereinbefore that object is accomplished in accordance with the invention in that each end closure is integrally formed with an end core, which comprises an inner end portion, which conforms to the inside surface of the housing tube, each end closure also comprises an end block having a shoulder abutting the end face of the housing tube, and each end closure is formed between said inner end portion and said shoulder with a peripheral groove, which accommodates a sealing element.

In the assembling of the housing in accordance with the invention the end closures are mounted at the ends of the housing tube simply in that their inner end portions are slidably inserted and a tight seal is ensured by the sealing element which is accommodated in the peripheral groove. The aligning of the end closures relative to the housing tube is also facilitated by the slidable insertion of the inner end portions. The intermediate portion in each end closure between the end block and the inner end portion may be provided on the axially outer side of the groove with a collar, which conforms to the inside surface of the housing tube so that the guidance of the inner end portion in the housing tube will be improved and the sealing between the groove and the end block will also be improved.

In the design in accordance with the invention the end closures are attached to the ends of the housing tube simply in that their inner end portions are inserted until a tight seal is ensured by the sealing element disposed in the peripheral groove. The aligning of the end closures relative to the housing tube is also facilitated by the insertion of the inner end portions. The intermediate portion between the end block and the inner end portion of the end closure may be provided with a short collar, which is disposed on the axially outer side of the groove and conforms to the inside surface of the housing tube so that the guidance of the inner end portion in the housing tube will be improved as well as the seal on the axially outer side of the groove.

In accordance with a preferred feature, the slot in the housing tube is closed by sealing lips and the end closure is formed in its inner end portion or beside that inner end portion in the shoulder of the end block with recesses which conform to and receive the ends of said sealing lips. If said recesses are formed in the end block, the ends of the sealing lips will extend along the inner end portion into the end block so that the end portions of said sealing lips will seal the peripheral groove.

A preferred feature of the invention resides in that the inner end portion is provided on its inner end face with an extension for extending into a retaining groove formed in the housing tube and retaining the scale member. That feature permits the provision of a gap between each end of the scale member and the inner end portion of the adjacent end closure so that differential thermal expansions of the scale member and the housing tube can be taken up.

In accordance with a further preferred feature of the invention the inner end portion of each end closure is formed with a recess, which has an upper portion which constitutes a continuation of the retaining groove of the housing tube and extends as far as to the peripheral groove which contains the sealing element. That recess receives the end of the scale member, which bears on the sealing element. In that case the scale member consisting, e.g., of glass, will be elastically supported by the sealing elements.

In accordance with a preferred feature each end block is formed with at least one injection opening, which extends from the outside of the end block to the peripheral groove and serves for an injection of a solidifiable liquid sealing composition, which is adapted to be cured or vulcanized. In that case the sealing material will exactly fill the cavity which has been left open and will seal also any gaps existing between the inner end portion of the end closure and the inside surface of the housing tube. Besides, the end closures will positively be locked to the housing tube. Vulcanizing may be effected when the end closures are aligned with the housing tube so that the alignment is frozen.

In accordance with a further preferred feature of the invention, the end closures are secured to the housing tube by the sealing elements and are locked in position by cross-pins, which adjacent to the peripheral grooves extend through the end portions of the housing tube and the inner end portions of the end closures.

The protective housing in accordance with the invention may be assembled with the scale member in a process in which the housing tube is held on an aligning plate, the end closures are attached to the longitudinal tube when it is held on said plate, at least one end closure is attached after the scale member and the sealing lips have been mounted, and when the end closures have been attached and the longitudinal tube and the end closures are still held on the aligning plate, a silicone sealing composition is injected through the injection openings and the cross-pins are mounted after the sealing composition has been vulcanized.

BRIEF DESCRIPTION OF THE DRAWINGS

FIG. 1 is an elevation showing an end closure viewed on its inner end portion.

FIG. 2 is a longitudinal sectional view showing a housing tube with an end closure shown in a side elevation.

DETAILED DESCRIPTION OF THE PREFERRED EMBODIMENTS

Figure 3:
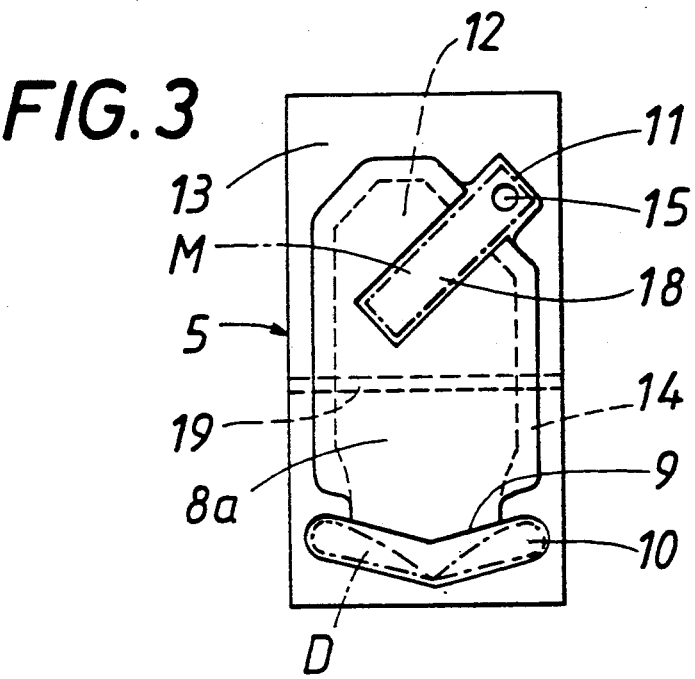
FIG. 3 shows a modified end closure.

The invention will now be described more in detail and by way of example with reference to the drawings.

The scale member M, the scanning unit A, the actuating member S and the sealing lips D shown in the drawings are well known in the art and are only diagrammatically represented in phantom in the drawing.

A housing tube 1 accommodates a scale member M, which may consist of a rectangular prismatic glass body, and a scanning unit A, which is directly guided on the scale member M. The housing tube 1 has a top wall 2, which is reinforced to form a carrier. On that side which is opposite to the top wall 2 the housing tube 1 is formed with a longitudinal slot 3, through which an actuating member 8 extends, which is coupled to the scanning unit A. One longitudinal edge portion of the scale member M extends into an inclined retaining groove 17, which is formed in the housing tube 1 at the corner between the top wall 2 and one side wall of the housing tube 1. From that retaining groove 17, the scale member M protrudes into the cavity of the housing tube 1 at an angle of about 45° to the direction in which the top wall 2 and the slot 3 are spaced apart. The housing tube 1 is formed on both sides of the slot 3 with grooves 4 for receiving the outer edges of sealing lips D, which resiliently bear on each other and seal the slot 3 and are forced apart by the swordlike actuating member S. That arrangement is known per se.

The housing tube 1 is provided at each end with an end closure 5. Each end closure 5 consists of a mounting end block 6 that is disposed outside the housing tube 1 and provided with a mounting opening 7, in which a fixing screw can be mounted, and of an end core 8, which at its inner end conforms to the inside surface of the housing tube at the top and on the sides and has a bottom edge 9 for resting on the top of the sealing lips D which have been inserted into the grooves 4. That bottom edge 9 of the end core also constitutes the top face of a recess 10, which is formed in the end block 6 and receives the ends of the sealing lips D. Each end closure 5 is also provided with a profiled extension 11 for closing the retaining groove 17 in which the scale member M is retained. Each end closure 5 is also provided with a short collar 12, which has the same shape in cross-section, shown in FIG. 1, as the inner end of the end core 8. Adjacent to the portions 8 and 12 the end block 6 has a shoulder 13. Between that shoulder 13 and the inner end portion 8 the end closure 5 is formed with a peripheral groove 14, which extends from the edge 9 on both sides as far as to the top of the grooves 4 for receiving the sealing lips D. A bore 15 extends from the peripheral groove 14 to the outside surface of the end block 6 and can be used to inject a solidifiable liquid sealing composition, preferably silicone rubber, into the groove 14.

Figure 4:
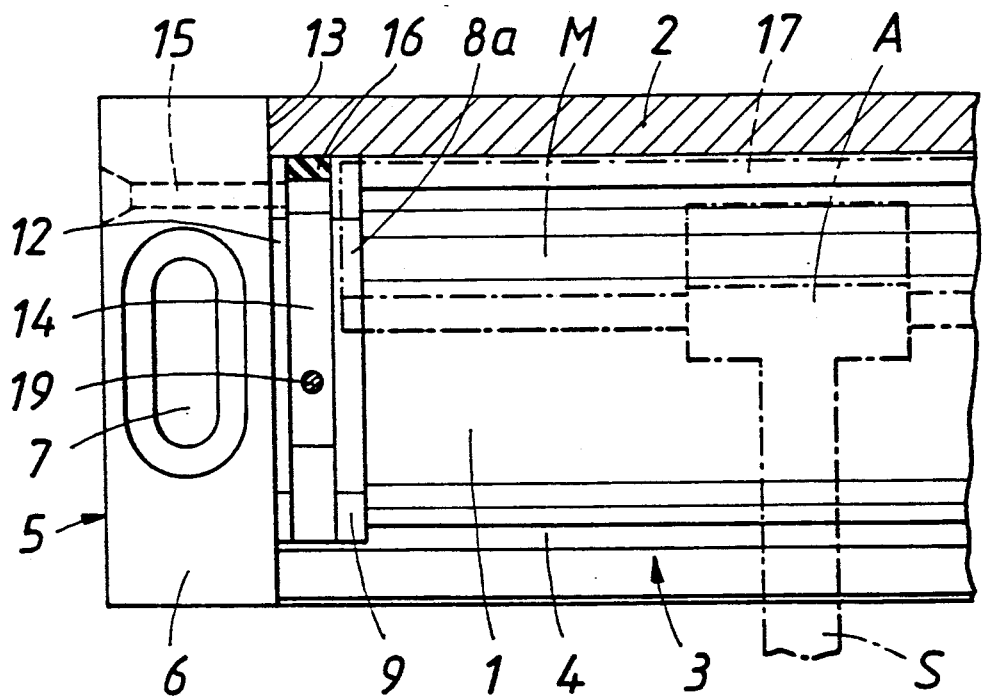
FIG. 4 is a longitudinal sectional view which is similar to that of FIG. 2 and shows the end closure of FIG. 3.

In the embodiment shown in FIGS. 3 and 4 the scale member M extends through a recess 18 in the inner end portion 8a of the end core 8 as far as to the peripheral groove 14 so that the ends of the scale member bear on the sealing element 16.

For assembling, the scale member M is mounted in the housing tube 1, the scanning unit A is mounted on the scale member A and the sealing lips D are inserted into the grooves 4. The housing tube 1 is then held on an aligning plate in an assembling position and with the housing tube 1 held in that position the end closures 5 are attached to the housing tube 1 so that the outside periphery of each end closure 5 is flush with the outer periphery of the profiled housing tube 1. Silicone rubber is then injected through the bores 15 to form the sealing elements 16 and to fill also any gaps between the end cores 8 and the inside surface of the housing tube 1 and the sealing lips D and, in the embodiment shown in FIGS. 3 and 4, also between the inner end portion 8a and the scale member M. When the end closures 5 have thus been attached, transverse locking pins 19 may be inserted into through bores which are provided adjacent to the groove 14 and preferably parallel to the mounting opening 7 so that the end closures 5 will be locked in position.

We claim:

1. In a kit for assembling a protective housing accommodating an elongate scale member and a scanning unit, which is movable along said scale member, said kit comprising a housing tube, which is generally rectangular in cross-section and has an inside surface and is adapted to retain said scale member in said housing tube, which housing tube has two end faces at opposite ends and a narrow side wall formed with a longitudinal slot, and two end closures, which are adapted to close said housing tube at opposite ends and to hold said housing tube in position, the improvement residing in that each of said end closures comprises an end block, which has a shoulder that is adapted to abut one of said end faces of said housing tube, and an end core, which is integrally formed with said end block and protrudes from said shoulder and is adapted to be inserted into said housing tube at one end thereof and has an inner end portion conforming to said inside surface of said housing tube, and each of said end closures is formed between said inner end portion and said shoulder with a peripheral groove for receiving a sealing element for contacting said inside surface of said housing tube.

2. The improvement set forth in claim 1 as applied to a kit in which said housing tube is provided with sealing lips extending on opposite sides of said longitudinal slot and sealing said slot, wherein each of said end closures is formed with recesses for receiving adjacent ends of said sealing lips.

3. The improvement set forth in claim 2, wherein said recesses are formed in said inner end portions of said end cores.

4. The improvement set forth in claim 2, wherein said recesses are formed in said shoulders of said end blocks.

5. The improvement set forth in claim 1, wherein said inside surface of said housing tube is formed with a longitudinal retaining groove for retaining said scale member and said inner end portion of each of said end closures has a free end face provided with a projection that is adapted to be inserted into said retaining groove.

6. The improvement set forth in claim 1, wherein said inside surface of said housing tube is formed with a longitudinal retaining groove for retaining said scale member, which retaining groove terminates short of said ends of said housing tube, and said inner end portion is formed with a recess, which is longitudinally aligned with said retaining groove and opens into said peripheral groove and is adapted to receive said scale member when it protrudes longitudinally from said retaining groove so that said scale member is supported by said sealing element.

7. The improvement set forth in claim 1, wherein each of said end blocks is formed with at least one injecting opening, which extends from the outside surface of the end block to said peripheral groove and is adapted to be used for injecting into said peripheral groove a liquid sealing composition which is solidifiable to form said sealing element.

8. The improvement set forth in claim 1, wherein said housing tube is formed adjacent to each of its ends with first transverse bores, which open into said peripheral groove, each of said end cores is formed with second transverse bores, which open into said peripheral groove and each of said end cores is adapted to be inserted into said housing tube at one end thereof so that said first and second bores are radially aligned and adapted to receive cross-pins for locking said end closure to said housing tube.

9. In an assembly for use in a length measuring system, which assembly comprises an elongate scale member, a scanning unit, which is movable along said scale member, and a protective housing accommodating said scale member and said scanning unit, which housing comprises a housing tube, which is generally rectangular in cross-section and has an inside surface and retains said scale member in said housing tube, which housing tube has two end faces at opposite ends and a narrow side wall formed with a longitudinal slot, and two end closures, which close said housing tube at opposite ends and are adapted to hold said housing tube in position, the improvement residing in that each of said end closures comprises an end block, which has a shoulder that abuts one of said end faces of said housing tube, and an end core, which is integrally formed with said end block and protrudes from said shoulder into said housing tube and has an inner end portion conforming to said inside surface of said housing tube, each of said end closures is formed between said inner end portion and said shoulder with a peripheral groove, and a sealing element contacting said inside surface of said housing tube is contained in said peripheral groove.

10. The improvement set forth in claim 9, wherein each of said end blocks is formed with at least one injecting opening, which extends from the outside surface of the end block to said peripheral groove said housing tube is formed adjacent to each of its ends with first transverse bores, which open into said peripheral groove, and each of said end cores is formed with second transverse bores, which open into said peripheral groove and are radially aligned with respective ones of said first bores, and cross-pins extend through each pair of radially aligned first and second bores to lock said end closures to said housing tube.

11. In a process of forming an assembly for use in a length measuring system, which assembly comprises an elongate scale member, a scanning unit, which is movable along said scale member, and a protective housing accommodating said scale member and said scanning unit, which housing comprises a housing tube, which is generally rectangular in cross-section and has an inside surface and retains said scale member in said housing tube, which housing tube has two end faces at opposite ends and a narrow side wall formed with a longitudinal slot, and two end closures, which close said housing tube at opposite ends and are adapted to hold said housing tube in position, wherein each of said end closures comprises an end block, which has a shoulder that abuts one of said end faces of said housing tube, and an end core, which is integrally formed with said end block and protrudes from said shoulder into said housing tube and has an inner end portion conforming to said inside surface of said housing tube, each of said end closures is formed between said inner end portion and said shoulder with a peripheral groove, and a sealing element contacting said inside surface of said housing tube is contained in said peripheral groove, each of said end blocks is formed with at least one injecting opening, which extends from the outside surface of the end block to said peripheral groove, said housing tube is formed adjacent to each of its ends with first transverse bores, which open into said peripheral groove, each of said end cores is formed with second transverse bores, which open into said peripheral groove and are radially aligned with respective ones of said first bores, and sealing lips extending on opposite sides of said longitudinal slot and sealing said slot, wherein said housing tube is held on an aligning plate in an assembling position, said end closures are attached to said housing tube when it is in said assembling position, said scale member and said sealing lips are mounted in said housing tube before at least one of said end closures is attached to said housing tube, a solidifiable liquid sealing composition is injected through said injecting openings into said peripheral grooves and is caused to solidify when said housing tube provided with said end closures is in said assembling position, and cross pins are inserted into repsective pairs of said first and second bores to lock said end closures to said housing tube when the latter provided with said end closures is in said assembling position and said sealing composition has solidified.

* * * * *